United States Patent [19]

Togo et al.

[11] 4,031,447
[45] June 21, 1977

[54] IMPROVED CONTROL SYSTEM FOR ENERGIZING A STEPPING MOTOR

[75] Inventors: Masaaki Togo, Kawasaki; Masao Shima, Shinagawa; Kiyoshi Mochizuki, Kamakura, all of Japan

[73] Assignee: Yamatake-Honeywell Company Limited, Tokyo, Japan

[22] Filed: June 27, 1975

[21] Appl. No.: 591,117

[30] Foreign Application Priority Data
July 2, 1974   Japan ............................. 49-75004

[52] U.S. Cl. ............................... 318/685; 318/696
[51] Int. Cl.² ........................................ H02K 37/00
[58] Field of Search ........................... 318/685, 696

[56] References Cited
UNITED STATES PATENTS

| | | |
|---|---|---|
| 3,374,410 | 3/1968 | Cronquist et al. ................. 318/685 |
| 3,746,959 | 7/1973 | Kobayashi et al. ................ 318/696 |
| 3,757,193 | 9/1973 | Inaba et al. ....................... 318/696 |
| 3,767,993 | 10/1973 | Yablonski ..................... 318/685 X |
| 3,812,413 | 5/1974 | Keidl ................................ 318/696 |
| 3,863,118 | 1/1975 | Lander et al. ..................... 318/685 |

*Primary Examiner*—Gene Z. Rubinson
*Attorney, Agent, or Firm*—Laurence J. Marhoefer; Lockwood D. Burton

[57] ABSTRACT

An improved control system for energizing a stepping motor varies the width of the stepping pulse to the stepping motor as the motor transfers from one balanced state to another in order to provide additional starting torque and disconnects the energizing source from the motor when the motor is in its balanced state in order to conserve energy.

7 Claims, 4 Drawing Figures

FIG. I

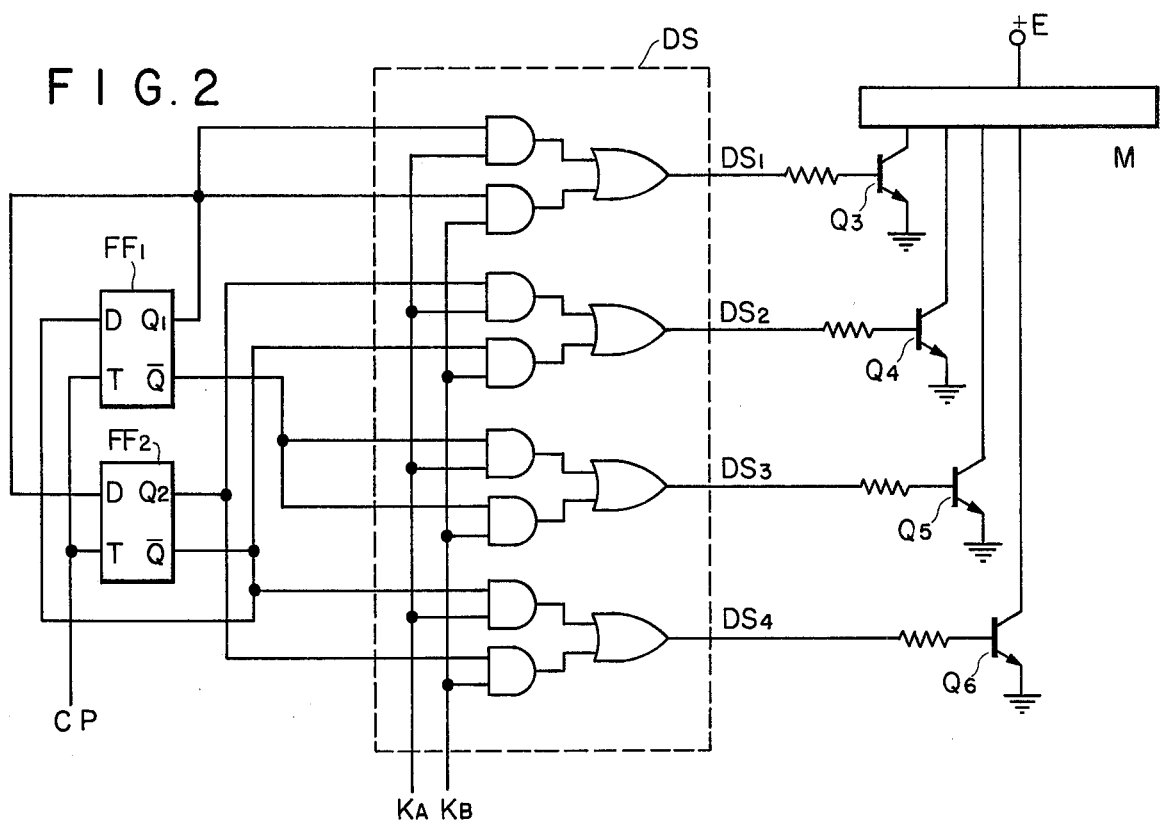
FIG. 2
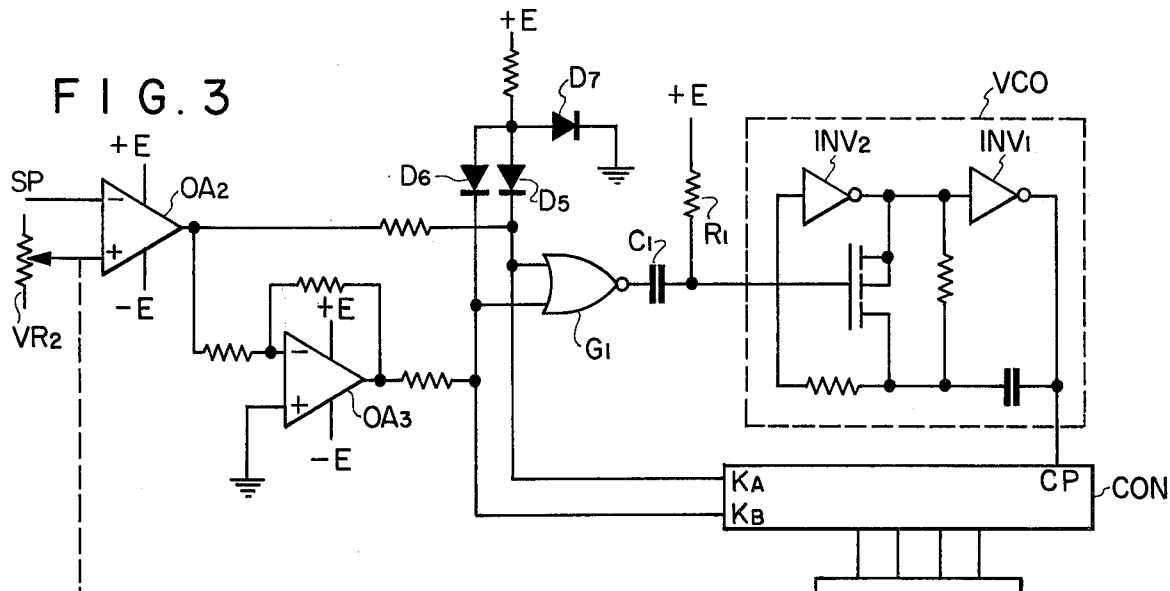
FIG. 3
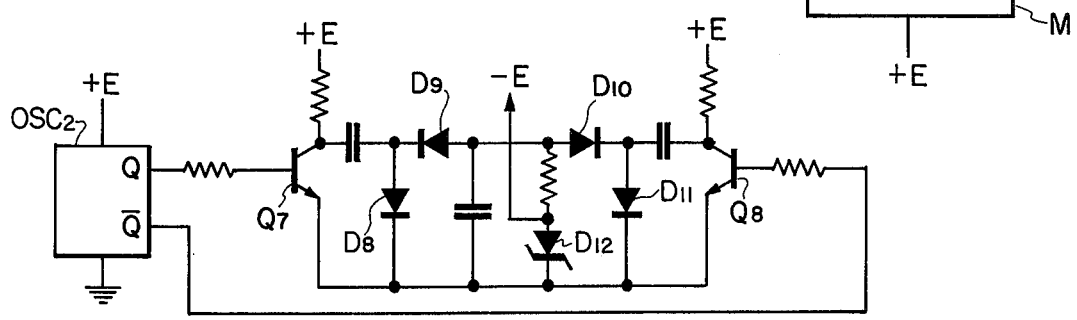

IMPROVED CONTROL SYSTEM FOR ENERGIZING A STEPPING MOTOR

BACKGROUND OF THE INVENTION

1. Field of the Invention

This invention relates to an improved control system for energizing a stepping motor; and, more particularly, to a system which is efficient in terms of the overall power consumed by the motor.

2. Description of the Prior Art

Stepping motors of the type to which this invention is applicable are well known in the art. Such stepping motors have a number of angular rotor positions at which the rotor is balanced. An electrical energy pulse causes the rotor of the motor to step from one balanced position to the next. The direction of rotation of the motor is determined by the sequence in which the field coil windings are energized as the total angle through which the rotor travels is a function of the number of pulses supplied to the field coil windings.

As will be appreciated by those skilled in the art, such stepping motors are advantageous in that the angular position of their rotor can be simply and accurately determined by counting the number of pulses supplied to the field coil windings. Such motors are used widely in numerical control machine tool systems and also in other process control systems. In the case of a process control system, for instance, the position of the stepping motor rotor can be varied as a function of the difference a feedback signal from a rebalancing element between a process variable signal and in order to rebalance the system.

In order to operate satisfactorily in most control systems, a stepping motor must usually develop a large torque as it initially steps from one balance state to a new balance state. the inertia or friction of the motor's rotor and the inertia or friction of the connected load call for this large torque. In addition, in control system applications, it is often desirable that the delivered torque vary as the motor steps through a series of positions.

It will further be appreciated that in a control system application the motor may sit at its balance point for considerable periods of time. If the field coils are energized during these periods, the system will be inefficient in terms of power consumption and also the motor will tend to overheat.

SUMMARY OF THE PRESENT INVENTION

Accordingly, one object of the present invention is to provide a control system for energizing a stepping motor which can cause the stepping motor to follow an input signal for instance, a process variable signal, so that the stepping motor provides suffient torque when it transfers from one balanced state to the other.

Another object of this invention is to provide the system for energizing the stepping motor which is operated by a single power supplying source and is useful for saving the electric power consumption by the stepping motor.

According to this invention, these other objects of the invention are achieved by a control system in which the width of the stepping pulse to the stepping motor can be varied when the stepping motor transfers from one balanced state to the other and wherein the power supply to energize the stepping motor is interrupted when the stepping motor is in a balanced state. Advantageously, the power supply to the system is a single power supply, or a power supply having an equivalent ability to that of two power supplies.

BRIEF DESCRIPTION OF THE DRAWINGS

Another object and advantages of this invention will be more fully understood from the description taken in conjunction with the accompanying drawings, in which:

FIG. 2 is a schematic diagram of the stepping motor control circuit shown in block form in FIG. 1;

FIG. 3 is a schematic diagram of an alternate embodiment of the invention; and

DESCRIPTION OF THE PREFERRED EMBODIMENT

Figure 1:
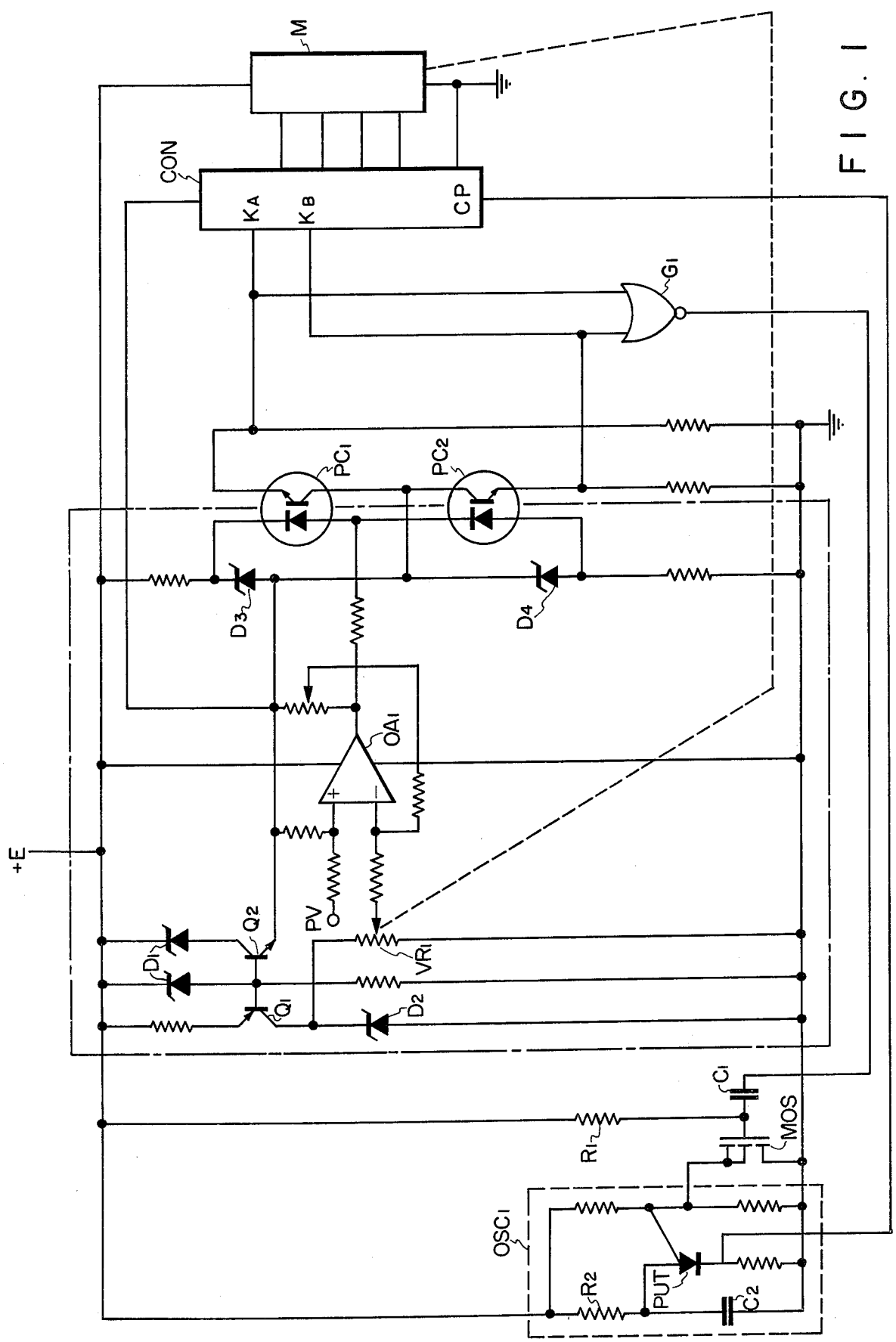
FIG. 1 is a schematic diagram (partially in block form) of one embodiment of the stepping motor control system of this invention.

Referring now to the drawings, FIG. 1 shows a schematic diagram of the system for energizing a stepping motor, which is designated by the reference letter M in accordance with the teachings of the present invention. In this figure, the emitter of a transistor $Q_1$ is coupled to the positive terminal of a direct current power supply, the collector of which is coupled to operational common which is a constant voltage. A zener diode $D_1$ provides a constant potential at the base of the transistor $Q_1$, and transistor $Q_1$ supplies from its collector a constant current. A second zener diode $D_2$ applies a constant potential to the collector of transistor $Q_1$. The collector of transistor $Q_1$ supplies a constant current to one terminal of a potentiometer $VR_1$ whose other terminal is connected to ground. The wiper arm of potentiometer $V_R$, which is mechanically coupled to, and driven by stepping motor M, is electrically coupled to one input of an operational amplifier $OA_1$.

The other input to operational amplifier $OA_1$ is the process variable signal PV. It will be appreciated that the output of amplifier $OA_1$ is a function of the difference between the signal coupled to the process variable terminal PV and the feedback rebalancing potential developed by the potentiometer $VR_1$.

The output of amplifier $OA_1$ is coupled to the light emitting elements of a pair of photocoupler switches $PC_1$ and $PC_2$. An emitter follower transistor $Q_2$, the base of which is supplied with a constant voltage from the zener diode $D_1$, is used as a constant voltage source for the photocoupler switches.

Zener diode $D_3$ provides a positive bias, with respect to the constant voltage from the emitter of $Q_2$, to one end of the light emitting element of photocoupler $PC_1$. Similarly, zener diode $D_4$ provides a bias or level shift from this constant voltage source to the other terminal of photocoupler $PC_2$.

The power for the light receiving elements of photocouplers $PC_1$ and $PC_2$ is supplied with a constant voltage from transistor $Q_2$. The outputs of these photocouplers develop, respectively, a voltage signal which is transmitted to a stepping motor energization control circuit CON as a control signal for controlling the forward or backward rotation of the stepping motor M. In addition, the outputs of photocouplers $PC_1$ and $PC_2$ are coupled as inputs to a NOR gate $G_1$.

In operation, photocoupler $PC_1$ turns on when the output of operational amplifier $OA_1$ exceeds the bias established on the light emitting element by transistor $Q_2$ and zener diode $D_3$. Similarly, photocoupler $PC_2$ turns on when the output of operational amplifier $OA_1$ falls below the bias established by transistor $Q_2$ and zener diode $D_4$ on the light emitting element of photocoupler $PC_2$. When the output signal of operational amplifier $OA_1$ is between these levels, both photocouplers are off.

NOR gate $G_1$ produces an output signal which is transmitted to the gate of an MOS (metal oxide semiconductor) switch whenever $PC_1$ or $PC_2$ is turned on. An RC network, comprising condenser $C_1$ and resistor $R_1$, couples the output from NOR gate $G_1$ to the base of the metal oxide switch MOS.

The resistance between the source and drain of the MOS forms a component part of an oscillator circuit $OSC_1$ which also comprises resistor $R_2$, condenser $C_2$ and a programmable uni-junction transistor PUT which serves as the active element of the oscillator. When either $PC_1$ or $PC_2$ comes on, NOR gate $G_1$ provides an output signal which temporarily increases the impedance between the source and drain of MOS and thereby decreases the oscillating frequency of $OSC_1$ for a period of time determined by the time constant of the RC network comprising resistor $R_1$ and a capacitor $C_1$.

Thus, it wil be appreciated that the output of oscillator $OSC_1$, whose output is coupled as a clock pulse input to the stepping motor energization control circuit CON, decreases initially from its normal steady state value and returns gradually to this frequency over a period of time determined by the time constant of the differential circuit $R_1$, $C_1$.

Referring now to FIG. 2 in addition to FIG. 1, FIG. 2 shows an embodiment of the energization control circuit CON. In this figure, a pair of D flip-flops $FF_1$ and $FF_2$ are connected in cascade with one another. The $\overline{Q}$ output of flip-flop $FF_2$ is the D input to flip-flop $FF_1$ and the Q output of $FF_1$ is the D input of $FF_2$, establishing a loop so that the outputs of $FF_1$ and $FF_2$ are reversed by two clock pulses CP with the phase shifted by one clock pulse cycle with respect to one another.

A data selector DS comprising AND gates and OR gates receives inputs from the flip-flop circuits $FF_1$ and $FF_2$ and also signals from $PC_1$ and $PC_2$ for forward rotation $K_A$ and backward rotation $K_B$.

For forward rotation, for example, pulses delayed one after the other by one clock pulse and each having a pulse width equal to two clock pulses appear sequentially on the output terminals $DS_1$ thru $DS_4$. In the case of backward rotation, pulses gaining one after the other by one clock pulse each of which is two pulse widths wide are coupled to the output terminals. In either case, the transistors $Q_3$ thru $Q_6$ are switched over from on to off or vice versa by each output pulse of the data selector DS to energize the stepping motor in the proper sequence or order.

In operation, the system for driving the stepping motor shown in FIGS. 1 and 2 is in its quiescent state and the motor M is not energized when the feedback voltage determined by the position of the wiper arm of the potentiometer $VR_1$ is almost equal to the input signal (the process variable signal PV in this case). In this situation, operational amplifier $OA_1$ has a positive output voltage proportionate to the difference between both input voltages. The magnitude of this output is within the range of the threshold levels established by the zener diodes $D_3$ and $D_4$ so that the electric current does not flow to the light emitting elements in the photocouplers $PC_1$ and $PC_2$. The output of photocouplers $PC_1$ and $PC_2$ is, in this case, logic 0 and all the outputs from the data selector of energization control circuit CON are logic 0. In this state, transistors $Q_3$ thru $Q_6$ are in their cutoff state. Accordingly, no energization current is supplied to the stepping motor M although the oscillating circuit $OSC_1$ continues to supply clock pulses having a steady state, constant period to the energization control circuit CON.

Summarizing the above operation, the circuit is in the balanced state when the difference between the input signal voltage and the feedback voltage is smaller than a predetermined small value; and, in this condition, the current to energize the stepping motor M is interrupted.

Next, assuming there is a difference between the input signal and the feedback voltage so that the output voltage of the operational amplifier $OA_1$ exceeds the voltage range of the threshold level, one of the outputs of photocouplers $PC_1$ or $PC_2$ becomes logic 1; which of the photocouplers becomes logic 1 depends upon whether the potential at the terminal PV exceeds or is less than the potential established by the potentiometer. Logic 1 from $PC_1$ or $PC_2$ provides a control signal for the energization of control circuit CON to enable the appropriate gates forward or background rotation of motor M.

Simultaneously upon the input of either logic 1, the output of NOR gate $G_1$ drops to low level and the oscillating frequency of the oscillating circuit $OSC_1$ is lowered initially, and then increased gradually towards its steady state frequency over a period determined by time constant of resistor $R_1$ and the condenser $C_1$. As a result of this, the stepping motor is supplied initially with the energization current having relatively lower frequency (wide pulse widths) and then is supplied gradually with the energization current having higher frequency. The motor is thereby controlled to the rotated forwardly or backwardly. The rotation of the stepping motor ceases when the feedback voltage coincides with the input voltage, and the motor energization current ceases. In other words, the energization current is not supplied to the stepping motor when it is in the balanced state but is supplied temporarily, with the pulse initially having a wide pulse width, when the stepping motor rotor transfers from the balanced state. Thereby, the consumption of electric power in the balanced state is saved while at the same time a large torque is obtained when the stepping motor starts rotating.

FIG. 3 is a circuit diagram of another circuit for driving a stepping motor embodying the present invention for indicating and/or recording the standard predetermined quantity or set point SP in this case wherein the circuit makes the rotation of angle of the stepping motor follow the preceding signal. The same component for the same function as that shown in FIG. 1 is indicated with like reference numerals or symbols. In FIG. 3, an operational amplifier $OA_2$ has the feedback voltage from $VR_2$ which varies in accordance with the rotation angle of the stepping motor M. This feedback voltage is compared with another input voltage SP, the standard set point. A second operational amplifier $OA_3$ is used as an inverted amplifier with unity gain, providing a logically inverted output of the output of the amplifier $OA_2$. The outputs from the operational amplifiers $OA_2$ and $OA_3$ are connected respectively to the cathodes of the diodes $D_5$ and $D_6$. The outputs of the amplifiers $OA_2$ and $OA_3$ are also coupled to the energization control circuit CON as a forward rotation signal (the output from $OA_2$) or a backward rotation signal (the output from $OA_3$), for example.

The anode voltage of diodes $D_5$ and $D_6$ is the forward voltage of the diode $D_7$; diodes $D_5$ and $D_6$ are used to clamp the negative output from $OA_2$ or $OA_3$, respectively, for protection of the NOR gate $G_1$ and the AND gates of the data selector DS.

The output of the NOR gate $G_1$ is applied to the gate of an MOS through the condenser $C_1$ and the differential circuit comprising the resistor $R_1$ as in the embodiment of FIG. 1, and the impedance variation of MOS changes the oscillating frequency of the voltage control oscillator VCO, which includes inverting amplifiers $INV_1$ and $INV_2$ as its active elements. The output of the voltage control oscillator VCO is transmitted as a series of clock pulses to the energization control circuit CON.

The negative power supplied to the operational amplifier $OA_2$ and $OA_3$ can be obtained by full-wave rectification of an oscillating output of the oscillator $OSC_2$ operated with the positive power supply. The full-wave rectification can be performed with transistors $Q_7$ and $Q_8$, and diodes $D_8$ thru $D_{11}$, which is then stabilized to a constant voltage by zener diode $D_{12}$.

In accordance with the circuit constructed as in FIG. 3, when the difference between a standard set point SP and the voltage corresponding to the rotation angle of the stepping motor is out of the range of allowable deviation, amplifiers $OA_2$ and $OA_3$ become saturated and have outputs which are logically inverted with respect to one another, thereby supplying the forward or backward rotation signal to the energization control circuit CON. Simultaneously, these outputs change the frequency of the voltage control oscillator VCO to an initially relatively low frequency then gradually back to its normal steady frequency. As a result of this operation, the stepping motor starts revolving to make the feedback input voltage of the operational amplifier $OA_2$ approach to the standard set point SP. When both voltages coincide, the forward and backward rotation signals both become logic 0, and the revolution of the stepping motor stops. In this balanced state, the energization current to motor M is interrupted.

Figure 4:
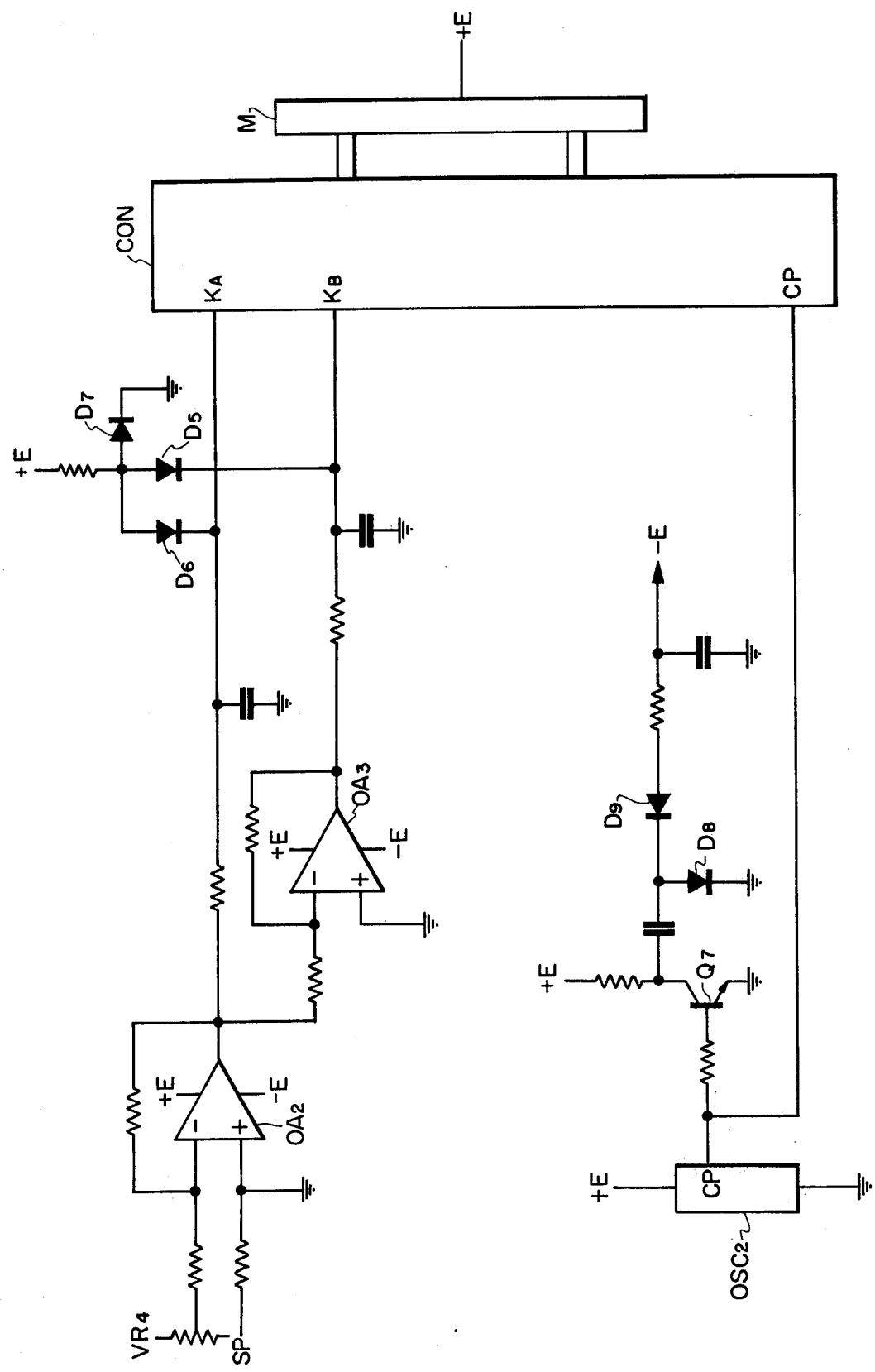
FIG. 4 is another schematic diagram of still another embodiment of the invention.

FIG. 4 shows another embodiment of the circuit for driving the stepping motor in accordance with the present invention. This circuit is similar to that of FIG. 3 but is used advantageously where there is no need to provide the stepping motor with as large torque as the circuit in FIG. 3 does. As no large torque is required, the voltage control oscillator VCO becomes unnecessary and the oscillating output of the oscillator $OSC_2$ has a constant frequency. The negative power source is conveniently derived from clock pulse for the energization control circuit CON.

As described above, in conjunction with FIG. 2 and 3, the difference between the input signal SP and the feedback voltage established by the variable resistor $VR_4$ is compared by the operational amplifier $OA_2$. When said difference is within the range of the predetermined allowable deviation, transmission of the forward or backward rotation signal to the energization control circuit for the stepping motor is ceased, and energization current supply to the stepping motor is interrupted. When said difference is out of said range, a rotation direction signal is transmitted to the energization control circuit.

The embodiments of the invention in which an exclusive property or privilege is claimed are defined as follows:

1. A control system for energizing a stepping motor for bidirectional rotational comprising in combination:
   a comparactor circuit with two input means and and output means;
   an input signal and a feedback signal;
   means for coupling the input signal to said one of said input means and the feedback signal to the other of said input means;
   a stepping motor;
   means for energizing said stepping motor;
   means responsive to an output of said comparator for periodically coupling said energizing means to said stepping motor;
   said responsive coupling means including a clock pulse generator, the pulse width of which determines the energy coupled to said motor is stepping;
   said coupling means coupling said energizing means to said motor to cause rotation in one direction in response to an output of said comparator at one level;
   said coupling means coupling said energizing means to said motor to cause rotation in the opposite direction in response to an output of said comparator at another level;
   said coupling means for decoupling said energizing means from said motor in response to an output of said comparator which is between said levels; and
   means for increasing the width of said clock pulses for a predetermined period in response to the output of said comparator initially reaching said one level.

2. A control system for energizing a stepping motor for bidirectional rotation comprising in combination;
   a comparator circuit with two input means and an output means;
   a single polarity power supply;
   means including said power supply for establishing a potential to serve as a system common;
   means for coupling said system common to one of said input means;
   an input signal and a feedback signal;
   means for coupling the input signal to said one of said input means and the feedback signal to the other of said input means;
   a stepping motor;
   means for energizing said stepping motor;
   means responsive to an output of said comparator for periodically coupling said energizing means to said stepping motor;
   said coupling means coupling said energizing means to said motor to cause rotation in one direction in response to an output of said comparator at one level;
   said coupling means coupling said energizing means to said motor to cause rotation in the opposite direction in response to an output of said comparator at another level; and
   said coupling means for decoupling said energizing means from said motor is response to an output of said comparator which is between said levels.

3. A control system for energizing a stepping motor as defined in claim 2 wherein said responsive coupling means further includes a pair of photocouplers.

4. A control system for energizing a stepping motor as defined in claim 3 wherein said responsive coupling means includes a clock pulse generator generating a series of clock pulses and means for increasing the width of said clock pulses for a predetermined period in response to the output of said comparator initially reaching said one level.

5. A control system for energizing a stepping motor as defined in claim 2 wherein said responsive coupling means includes a clock pulse generator generating a series of clock pulses and means for increasing the width of said clock pulses for a predetermined period in response to the output of said comparator initially reaching said one level.

6. A control system for energizing a stepping motor comprising in combination;
 a comparator circuit having two input means and one output means;
 an input signal and a feedback signal;
 means for coupling the input signal to one of said input means and the feedback signal to the other of said input means;
 a stepping motor;
 means for energizing said stepping motor;
 an inverter for inverting an output of said comparator;
 means responsive to outputs of said comparator and said converter for periodically coupling said energizing means to said stepping motor; p1 said responsive coupling means including a clock pulse generator, the pulse width of which determines the energy coupled to said motor in stepping;
 said coupling means coupling said energizing means to said motor to cause rotation in one direction in response to outputs of said comparator and said inverter at one level;
 said coupling means said energizing means to said motor to cause rotation in the opposite direction in response to outputs of said comparator and said inverter at another level;
 said coupling means decoupling said energizing means from said motor in response to outputs of said comparator and said inverter which are between said levels; and
 means for generating a two polarity voltage from a power supply with one polarity for said control system for energizing a stepping motor.

7. A control system for energizing a stepping motor as defined in claim 6 wherein said responsive coupling means includes means for increasing the width of said clock pulses for a predetermined period in response to the output of said comparator initially reaching said one level.

* * * * *